United States Patent [19]

Heine et al.

[11] 3,744,457
[45] July 10, 1973

[54] ANIMAL RESTRAINING APPARATUS
[76] Inventors: Joseph O. Heine, 61 James Way, Scituate; Duwayne Simmons, 84 Pleasant St., Randolph, both of Mass.
[22] Filed: Aug. 15, 1972
[21] Appl. No.: 280,823

[52] U.S. Cl. ............................................... 119/103
[51] Int. Cl. .............................................. A61d 03/00
[58] Field of Search .................... 119/103; 287/116; 285/158

[56] References Cited
UNITED STATES PATENTS
3,250,252  5/1966  Leopold .............................. 119/103
3,524,434  8/1970  Finley ................................. 119/103
3,437,357  4/1969  Rubin ............................. 285/158 X Primary Examiner—Hugh R. Chamblee
Attorney—Gilbert L. Wells

[57] ABSTRACT

Animal restraining apparatus which is table mounted and which engages the hind quarters of an animal to immobilize the animal against vertical movement while permitting horizontal movement and substantially free access to the body of said animal.

5 Claims, 6 Drawing Figures

PATENTED JUL 10 1973 3,744,457

ANIMAL RESTRAINING APPARATUS

BACKGROUND OF THE INVENTION

1. Field of the invention

This invention relates to a new and improved animal restraining device which serves to immobilize the animal from vertical movement while permitting horizontal movement of the animal and free access to the animal for grooming purposes and the like.

2. The prior art

It has been known in the veterinary art to provide devices which totally immobilize an animal by surrounding the animal with a frame. These prior art devices immobilize the animal against horizontal or vertical movement. Obviously, when grooming an animal it is necessary for the person doing the grooming to move about the grooming table. Such prior art devices suffer from the further inherent disadvantage of limiting access to those portions of the coat of the animal in close proximity to the restraining members.

SUMMARY OF THE INVENTION

In accordance with the present invention, it has been discovered that an animal can be immobilized against vertical movement while on a grooming table while still permitting controlled horizontal movement of the animal. This invention serves the two-fold purpose of allowing more ready access to the animal and minimizing fear in the animal due to total immobilization. The device of the present invention does not require a special table since it can be readily installed on a conventional table as will be shown hereinbelow. The device of the present invention has the additional advantage of quick removability or, alternatively, it can be swung to a position where it will not interfere with the use of the table for other purposes.

According to the present invention, these advantages are obtained by detachably mounting on a conventional table an adjustable elongated upstanding member. This upstanding member is frictionally mounted in a base affixed to the table. The friction mounting allows vertical adjustment of the upstanding member and additionally permits controlled rotation of the upstanding member relative to the fixed base. The upper end of the upstanding member has connected thereto by detachable means a horizontal member. This horizontal member has affixed at the free end thereof animal restraining means. The restraining means preferably consist of a U-shaped detachable yoke to which a flexible strap is affixed. The yoke is slipped under the hind quarters of the animal and the strap is buckled over the back of the animal. The yoke is then connected to the horizontal member, the upstanding member having been previously adjusted to conform to the size of the particular animal undergoing treatment. By this invention the hind quarters of the animal are supported, preventing the animal from lying or sitting down, or from jumping off the table. It will be readily apparent that the use of the device of the present invention to immobilize the hindquarters only of the animal permits free access to the body of the animal while eliminating the possibility of accidental choking or other injury to the animal.

DESCRIPTION OF THE PREFERRED EMBODIMENT

The improved animal restraining apparatus can best be described with reference to the drawings which illustrate a preferred embodiment of the present invention.

Figure 1:
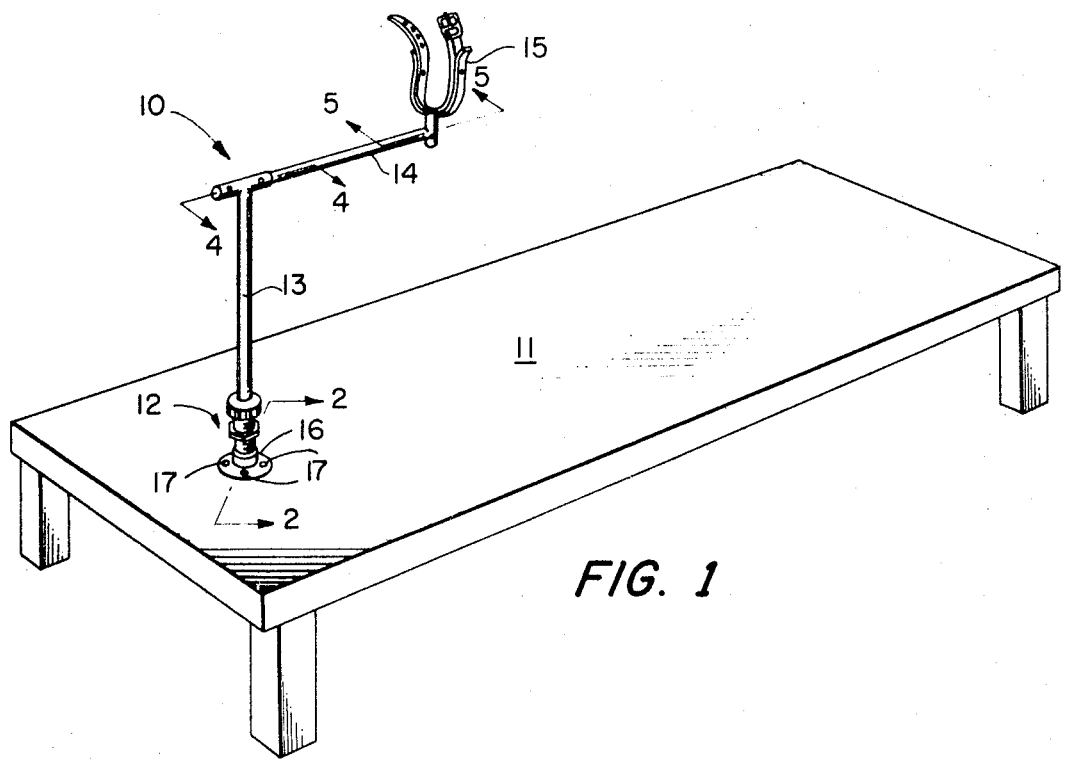
FIG. 1 is a view in perspective showing the device of the present invention mounted in operative position on a grooming table.

As shown in FIG. 1, the restraining device 10 is mounted on a table 11. The restraining device consists generally of a base assembly 12, an upstanding member 13 which is preferably in the form of a metal tube or pipe, an adjustable horizontal member 14 and detachable yoke means 15.

Figure 2:
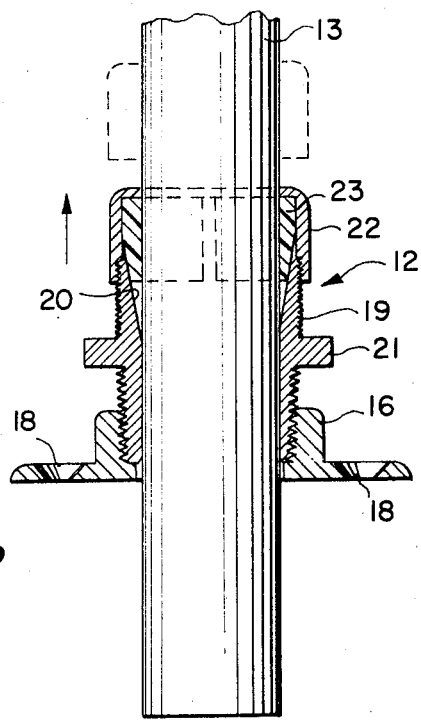
FIG. 2 is a fragmentary cross-sectional view taken along the lines 2—2 of FIG. 1, showing the base mounting means and the frictional support means.

As particularly shown in FIG. 2, the base assembly 12 comprises a mounting plate 16 which is fastened to the table 11 by suitable fastening means 17 such as bolts or screws which extend through mounting holes 18 in the mounting plate 16. A threaded coupling 19 which has an internal taper 20 in the top portion thereof is threadably engaged within the mounting plate 16. The coupling 19 is preferably provided with a hexagonal, outwardly extending central portion 21 for ease of assembly. The upstanding member 13, preferably an aluminum or magnesium tube, is slidably positioned within the coupling 19 and extends downwardly through a concentric hole in the table (not shown). Slidably and rotatably mounted on the upstanding member 13 is a locking member 22 which is internally threaded for engagement with the top portion of threads on the collar 19. Disposed within the locking member 22 is a cylindrical tapered bushing 23 preferably formed of nylon or the like. When the locking member 22 is tightened onto the collar 19, the tapered bushing 23 is compressed between the tapered portion 20 of the collar 19 and the upstanding member 13 causing frictional engagement therebetween. The degree of engagement is controlled by the degree of tightening of the locking member 22. Vertical and rotational movement of upstanding member 13 is thereby controlled.

Figure 3:
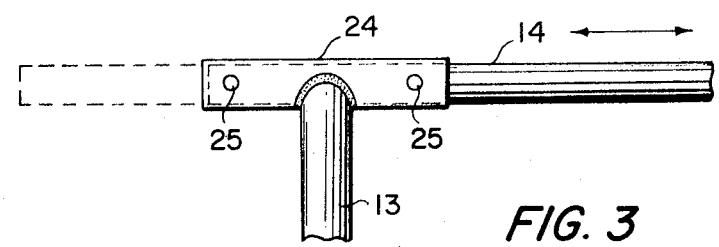
FIG. 3 is a side view of the horizontal member and yoke means of FIG. 1, showing the adjustable feature thereof in phantom lines.
Figure 4:
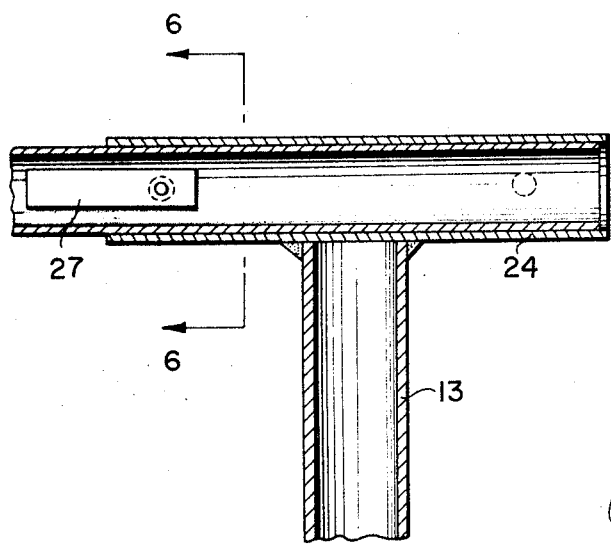
FIG. 4 is a fragmentary cross-sectional view of the connection between the upstanding and horizontal members of FIG. 1, taken along the lines 4—4.
Figure 5:
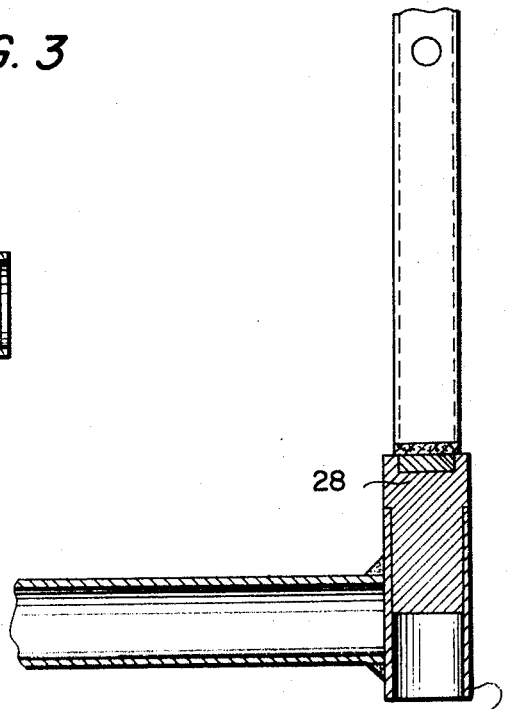
FIG. 5 is a fragmentary cross-sectional view of the connection between the yoke support and the horizontal member of FIG. 1, taken along the lines 5—5.

A cylindrical member 24 is fixedly attached to the upper end of the upstanding member 13 by welding or the like, as shown in FIGS. 3 and 4. This cylindrical member 24 contains positioning holes 25 disposed along its length.

Figure 6:
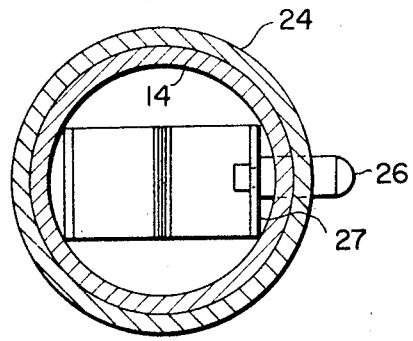
FIG. 6 is a cross-sectional view of the latching mechanism of the horizontal member to the upstanding member of FIG. 4, taken along the lines 6—6.

A horizontal member 14, preferably in the form of a metal tube or pipe, is slidably disposed within the cylindrical member 24. Disposed within one end of the horizontal member 14 is a locking lug 26 which is urged outwardly by a leaf spring means 27. The locking lug 26, shown in FIG. 6, engages a selected positioning hole 25 to position the horizontal member 14 relative to the upstanding member 13. At the other end of the horizontal member 14 there is affixed (by welding or the like) socket means 31. The socket means 31 is adapted to receive therein the lower terminal portion 28 of the yoke 15. The upper portion of the yoke 15 is generally U-shaped. At each end of the yoke 15 there is connected (by rivets or the like) a leather or plastic strap 29, the ends of which are adjustably connected by a buckle 30 or the like.

In operation, the height of the horizontal bar 14 is adjusted through the locking means 23 to conform to the size of the animal being treated or groomed. The yoke 15 is passed beneath the hind quarters of the animal (not shown), and the straps 29 are engaged by the buckle 30 over the back of the animal. The lower terminal portion 28 of the yoke 15 is inserted into the socket 31. The animal is thus immobilized against vertical movement while being free to move horizontally about the upstanding member 13 and the socket 31. The locking lug 26 can be depressed at any time to allow the horizontal member 14 to be adjusted relative to the upstanding member 13.

Although the present invention has been described in connection with the preferred embodiment, it is to be understood that modifications and variations may be resorted to without departing from the spirit and scope of the invention and the appended claims.

We claim:

1. An animal restraining apparatus for immobilizing the hind quarters of an animal against vertical movement while permitting controlled horizontal movement of said animal comprising, in combination, an elongated substantially flat table surface having a hole therethrough proximate to one end thereof, flange means secured to said table surface, said flange means having an internally threaded bore concentric with said hole in said table surface, externally threaded cylindrical collar means threadably engaged at one end thereof with said flange means and having a tapered internal portion at the other end thereof, an upstanding member slidably and rotatably mounted within said collar means, internally threaded locking means slidably and rotatably mounted on said upstanding member, tapered cylindrical friction means mounted within said locking means whereby threaded engagement of said locking means with the upper portion of said collar will cause frictional engagement of said friction means with said upstanding member, a horizontal member slidably connected at a first end to said upstanding member at the upper end thereof, and yoke means for engagement with the hindquarters of an animal detachably connected to the second end of said horizontal member.

2. The animal restraining apparatus of claim 1, including cylindrical means fixed normal to the upper end of said upstanding member, said cylindrical means having positioning holes disposed along the length thereof, said cylindrical member slidably receiving said horizontal member, and displaceable locking lugs on said horizontal member engageable with the positioning holes in said cylindrical member to prevent lateral movement of said horizontal member relative to said cylindrical member.

3. The animal restraining device of claim 2, including socket means fixed to said second end of said horizontal member, said yoke means pivotally connected to said horizontal member by said socket means.

4. The animal restraining device of claim 1, wherein said cylindrical friction means is a tapered nylon bushing.

5. The animal restraining device of claim 1, further comprising strap means connected to said yoke means for securing said animal to said yoke means.

* * * * *